(12) United States Patent
Tao et al.

(10) Patent No.: US 7,756,068 B2
(45) Date of Patent: Jul. 13, 2010

(54) SELECTING AN INTERFACE IN A MULTI-RADIO ENABLED DEVICE

(75) Inventors: Xiao-Jiao Tao, Jarfalla (SE); Jacob Lerenius, Stockholm (SE)

(73) Assignee: Sony Ericsson Mobile Communications AB, Lund (SE)

(*) Notice: Subject to any disclaimer, the term of this patent is extended or adjusted under 35 U.S.C. 154(b) by 483 days.

(21) Appl. No.: 11/672,656

(22) Filed: Feb. 8, 2007

(65) Prior Publication Data

US 2008/0192665 A1   Aug. 14, 2008

(51) Int. Cl.
*G08C 17/00* (2006.01)
(52) U.S. Cl. .................... 370/311; 370/463; 455/418
(58) Field of Classification Search ............. 455/552, 455/574, 550, 417; 370/338, 311, 310
See application file for complete search history.

(56) References Cited

U.S. PATENT DOCUMENTS

| 2003/0104848 A1* | 6/2003 | Brideglall ............... 455/574 |
| 2003/0231607 A1* | 12/2003 | Scanlon et al. ............ 370/338 |
| 2006/0084417 A1* | 4/2006 | Melpignano et al. ........ 455/418 |
| 2006/0259951 A1* | 11/2006 | Forssell et al. ............. 726/1 |

FOREIGN PATENT DOCUMENTS

WO   WO 2004/008693 A1   1/2004
WO   WO 2006/114712 A1   11/2006

OTHER PUBLICATIONS

Khaled Mahmud, Masugi Inoue, Homare Murakami, Mikio Hasegawa, Hiroyuki Morikawa, "Energy Consumption Measurement of Wireless Interfaces in Multi-Service User Terminals for Heterogeneous Wireless Networks", IEICE Trans. Commun., vol. E88-B, No. 3 Mar. 2005.*
Shuguang Cui, Andrea J. Goldsmith, Ahmad Bahai, "Modulation Optimization under Energy Constraints", Proceedings of ICC, 2003.*
International Search Report with Written Opinion in PCT Application No. PCT/IB2007/053126, mailed Feb. 14, 2008, 16 pages.
"Energy Consumption Measurement of Wireless Interfaces in Multi-Service User Terminals for Heterogeneous Wireless Networks", IEICE Transactions on Communications, Communications Society, vol. E88-B, No. 3, Mar. 2005, pp. 1097-1110, XP001225587.
"Power Consumption and Energy Efficiency Comparisons of WLAN Products", Atheros Communications, Inc. White Paper, 2003, 21 pages, XP-002467192.

* cited by examiner

*Primary Examiner*—Kent Chang
*Assistant Examiner*—Shahriar Behnamian
(74) *Attorney, Agent, or Firm*—Harrity & Harrity, LLP (57) ABSTRACT

A device may identify interfaces, determine an energy-time product for each of the identified interfaces, and transmit data through one of the identified interfaces based on the determined energy-time products.

19 Claims, 10 Drawing Sheets

| Interface Type | Data size (MB) | $T_{overhead}$ (sec) | Throughput (Mbps) | $W_{host}$ (W) | $W_{connect}$ (W) | $J_{overhead}$ | $T_{transfer}$ (sec) | $W_{transfer}$ (W) | J | T | JT |
|---|---|---|---|---|---|---|---|---|---|---|---|
| BT | 1 | 20 | 0.67 | 0.06 | 0.01 | 1.4 | 11.9 | 0.1 | 2.7 | 31.9 | 84.8 |
| WLAN | 1 | 20 | 4.5 | 0.06 | 0.11 | 3.4 | 1.8 | 0.6 | 4.5 | 21.8 | 97.3 |
| UWB | 1 | 20 | 70 | 0.06 | 0.17 | 4.6 | 0.1 | 0.5 | 4.7 | 20.1 | 93.7 |
| BT | 4 | 20 | 0.67 | 0.06 | 0.01 | 1.4 | 47.8 | 0.1 | 6.4 | 67.8 | 437.7 |
| WLAN | 4 | 20 | 4.5 | 0.06 | 0.11 | 3.4 | 7.1 | 0.6 | 7.7 | 27.1 | 207.9 |
| UWB | 4 | 20 | 70 | 0.06 | 0.17 | 4.6 | 0.5 | 0.5 | 4.8 | 20.5 | 99.0 |
| BT | 50 | 20 | 0.67 | 0.06 | 0.01 | 1.4 | 597.0 | 0.1 | 64.1 | 617.0 | 39542.4 |
| WLAN | 50 | 20 | 4.5 | 0.06 | 0.11 | 3.4 | 88.9 | 0.6 | 56.7 | 108.9 | 6177.6 |
| UWB | 50 | 20 | 70 | 0.06 | 0.17 | 4.6 | 5.7 | 0.5 | 7.6 | 25.7 | 194.7 |
| BT | 1 | 60 | 0.67 | 0.02 | 0.01 | 1.8 | 11.9 | 0.1 | 3.1 | 71.9 | 219.7 |
| WLAN | 1 | 40 | 4.5 | 0.02 | 0.11 | 5.2 | 1.8 | 0.6 | 6.3 | 41.8 | 261.8 |
| UWB | 1 | 60 | 70 | 0.02 | 0.17 | 11.4 | 0.1 | 0.5 | 11.5 | 60.1 | 688.9 |
| BT | 4 | 60 | 0.67 | 0.02 | 0.01 | 1.8 | 47.8 | 0.1 | 6.8 | 107.8 | 734.4 |
| WLAN | 4 | 40 | 4.5 | 0.02 | 0.11 | 5.2 | 7.1 | 0.6 | 9.5 | 47.1 | 446.0 |
| UWB | 4 | 60 | 70 | 0.02 | 0.17 | 11.4 | 0.5 | 0.5 | 11.6 | 60.5 | 703.6 |
| BT | 50 | 60 | 0.67 | 0.02 | 0.01 | 1.8 | 597.0 | 0.1 | 64.5 | 657.0 | 42368.6 |
| WLAN | 50 | 40 | 4.5 | 0.02 | 0.11 | 5.2 | 88.9 | 0.6 | 58.5 | 128.9 | 7544.3 |
| UWB | 50 | 60 | 70 | 0.02 | 0.17 | 11.4 | 5.7 | 0.5 | 14.4 | 65.7 | 944.4 |

| P1 (MB) | P2 (MB) | Least JT Interfaces |
|---|---|---|
| 13 | 25 | BT, WLAN, UWB |
| ⋮ | ⋯ | |

SELECTING AN INTERFACE IN A MULTI-RADIO ENABLED DEVICE

TECHNICAL FIELD OF THE INVENTION

Implementations described herein are related to data communication and more specifically pertain to methods and devices for selecting a wireless network interface in multi-radio enabled devices.

DESCRIPTION OF RELATED ART

Many portable devices are based on a multi-radio platform. While the platform is capable of providing location-independent connectivity and mobility, it also gives end-users who are unfamiliar with various technologies an unwanted choice between different types of communication media.

SUMMARY

According to one aspect, a method may comprise identifying interfaces, determining an energy-time product for each of the identified interfaces, and transmitting data through one of the identified interfaces based on the determined energy-time products.

Additionally, determining an energy-time product for each of the identified interfaces may include determining the energy-time product for each of the identified interfaces based on a size of the data.

Additionally, identifying interfaces may include identifying available wireless network interfaces with free connections.

Additionally, determining an energy-time product for each of the identified interfaces may include performing a lookup at a database for the energy-time product for each of the identified interfaces based on a size of the data.

Additionally, the method may further comprise evaluating the energy-time product of the one of the identified interfaces by measuring parameters associated with transmitting the data, and updating the database with the evaluated energy-time product of the one of the identified interfaces.

Additionally, determining an energy-time product for each of the identified interfaces may include multiplying total energy, which is projected to be consumed for transmitting the data, by a total duration of time, which is projected to take for transmitting the data.

Additionally, determining an energy-time product for each of the identified interfaces may further include producing the total energy by adding energy, which is projected to be used while transmitting the data, to energy which is projected as an overhead associated with transmitting the data.

Additionally, determining an energy-time product for each of the identified interfaces may further include producing the total duration of time by adding one time duration, which is projected to take for transmitting the data, to another time duration which is projected as an overhead associated with transmitting the data.

Additionally, determining an energy-time product for each of the identified interfaces may further include determining the one time duration by dividing a size of the data by a throughput of the identified interface.

Additionally, transmitting data through one of the identified interfaces based on the determined energy-time products may include selecting, among the identified interfaces, an interface with a smallest energy-time product, establishing a connection using the selected interface, and transmitting the data through the established connection.

According to another aspect, a device may comprise a processor to determine available connections that are free, obtain energy-time products for the free connections based on a size of data to be sent, select among the free connections a connection that has a minimum energy-time product, and send the data through the selected connection.

Additionally, the device may further comprise wireless network interfaces at which the free connections are available.

Additionally, an energy-time product may include a product of total energy and total time used to transmit the data.

Additionally, the total energy may include energy to switch one of the wireless network interfaces from an idle mode to a transmission mode.

Additionally, the total time may include time to switch one of the wireless network interfaces from an idle mode to a transmission mode.

Additionally, the wireless network interfaces may include at least one of a Bluetooth interface, a Wireless Local Area Network interface, or an Ultra Wide Band interface.

According to yet another aspect, a device may comprise means for storing sets of information, each set of information providing energy-time products for transmission of data through network interfaces, means for choosing a network interface among the network interfaces based on one of the sets of information, and means for transmitting specified data through the chosen network interface.

Additionally, the sets of information may include measured values of power at the network interfaces.

According to further aspect, a computer readable medium may comprise instructions for causing a processor to detect connections that are free, retrieve energy-time products for the free connections based on a size of data to be communicated, select among the free connections a connection that has a lowest energy-time product, and communicate the data through the selected free connection.

Additionally, the instructions for causing the processor to communicate the data may include instructions for causing the processor to receive the data through the selected free connection.

Additionally, the instructions for causing the processor to communicate the data may include instructions for causing the processor to transmit the data through the selected free connection.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION OF EMBODIMENTS

The following detailed description refers to the accompanying drawings. The same reference numbers in different drawings may identify the same or similar elements. The term "Bluetooth," as used herein, may refer to standard for short range communication. Depending on context, Bluetooth may also refer to a Bluetooth device, a Bluetooth component, or hardware and/or software interface that conform to the Bluetooth standard.

The term "WLAN," as used herein, may refer to a wireless local area network. In addition, WLAN may refer to a WLAN device, a WLAN component, or a hardware and/or software WLAN interface for participating in WLAN.

The term "Ultra Wide Band (UWB) device" may refer to a device, a component, or an interface for ultra wide band (i.e., bandwidth>500 MHz) communication. In addition, UWB may refer to communication based on ultra wide band or to communication methods based on UWB radio platform. Examples of standards that are based on ultra wide band may include wireless Universal Serial Bus (WUSB), Bluetooth (i.e., Bluetooth standard) over ultra wide band, and WiNet (IP over UWB). Examples of other standards related to UWB may include Multi-Band Orthogonal Frequency Division Multiplexing (MB-OFDM) and Direct Sequence UWB (DS-UWB).

In the following implementations, a device may automatically select a wireless network interface among different types of wireless network interfaces that are available on the device for transferring information. The device may select the wireless network interface with the smallest energy-time product, to be described shortly, for transferring the information.

The energy-time product may represent a product of energy and time that are spent to transmit or receive the information. In effect, the energy-time product blends communication costs in terms of energy and time and expresses the blended costs in a single number. Given several wireless network interfaces, selecting the wireless network interface with the lowest energy-time product may provide the best value, when both the energy and time are considered.

Exemplary Device

Figure 1:
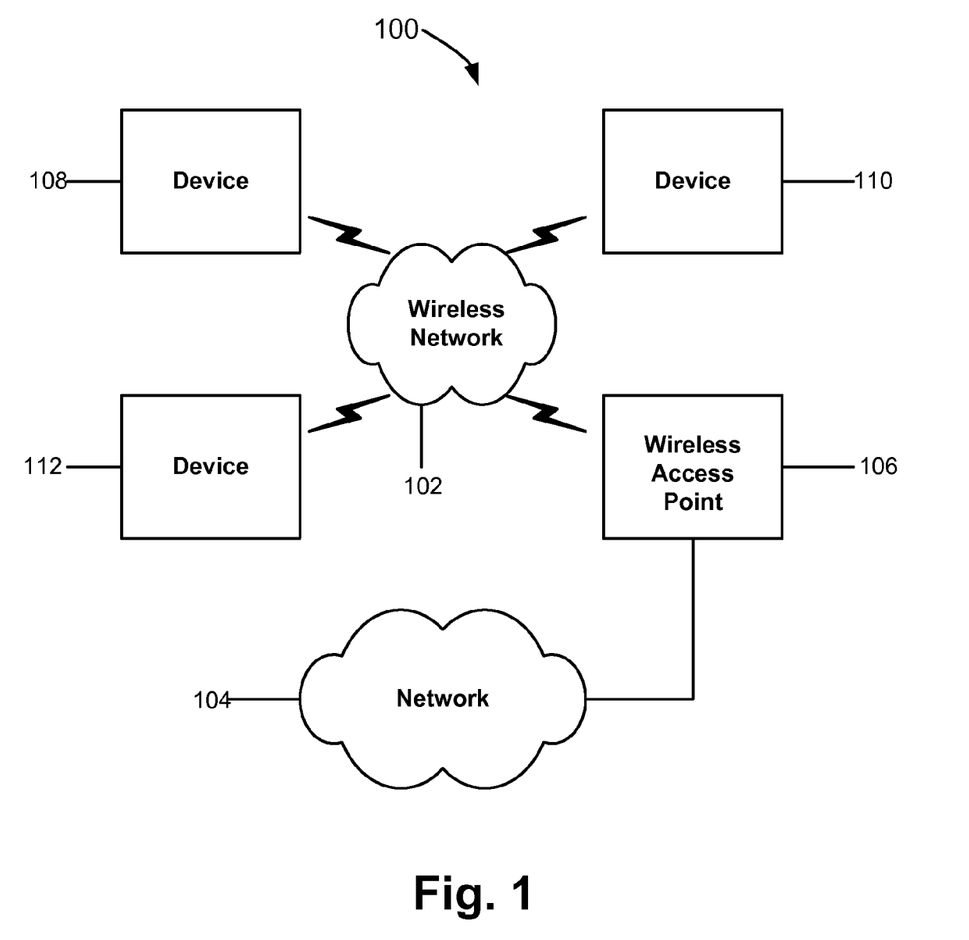
FIG. 1 depicts an exemplary network in which systems and methods described herein may be implemented.

FIG. 1 depicts an exemplary network in which systems and methods described herein may be implemented. Network 100 may include wireless network 102, network 104, wireless access point 106, and devices 108, 110, and 112. In practice network 100 may include fewer or additional wireless networks, networks, wireless access points, and/or devices.

Wireless network 102 may include a local network that interconnects wireless devices within their immediate proximity. These devices may be located nearby (e.g. less than 1 meter up to about 100 meters) and may frequently or occasionally come within range and go out of range of each other.

Network 104 may include one or more packet switched networks, such as the Internet, an intranet, a local area network, a wide area network (WAN), or another type of network, such as Public Switched Telephone Network (PSTN), that is capable of transmitting data from a source device to a destination device. Network 104 may also include one or more wireless networks for receiving wireless signals and forwarding the wireless signals toward the intended destination.

Wireless access point 106 may include a device that operates as a gateway into network 104. Examples of wireless access point 106 include a personal computer that is connected to a local area network (LAN) through an Ethernet card or a base station that is connected to the PSTN.

Device 108 may include any of the following devices that have the ability to communicate wirelessly or adapted to include one or more wireless communication media: a radio telephone; a personal communications system (PCS) terminal that may combine cellular radiotelephone with data processing, facsimile, and/or data communications capabilities; a mobile telephone; an electronic notepad; a laptop; a personal computer (PC); a personal digital assistant (PDA) that can include a radiotelephone, pager, Internet/intranet access, web browser, organizer, calendar, and/or GPS receiver; wireless computer peripherals (e.g., wireless speakers, wireless microphones, wireless camera, flash memory stick with wireless transceivers); or any device with sufficient computing power and memory to support functions described herein. Devices 110 and 112 may include similar devices as device 108. Devices 108, 110 and 112 may communicate with each other through wireless network 102 or to another device in network 104 through wireless access point 106.

Figure 2:
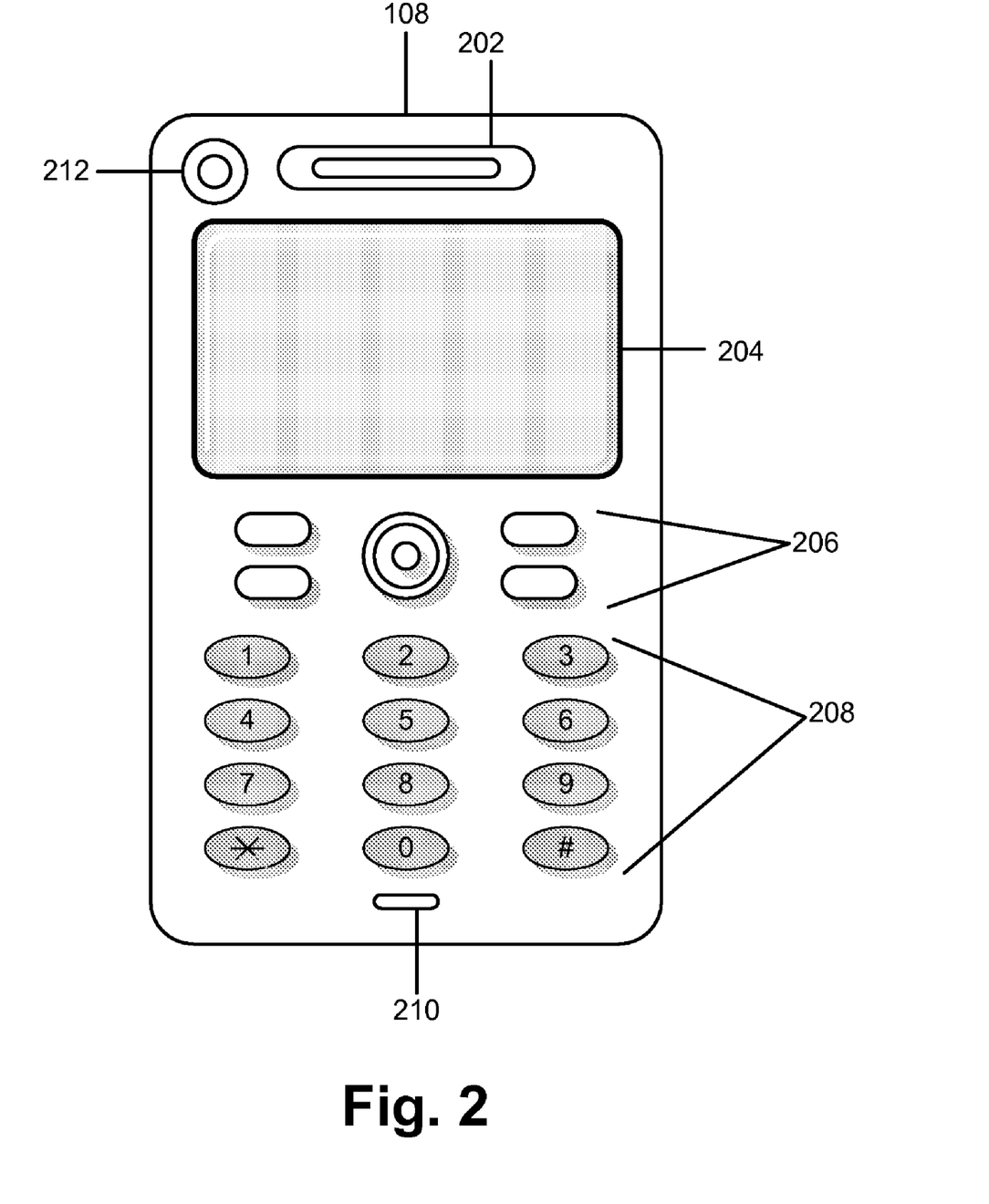
FIG. 2 is an exemplary diagram of the device of FIG. 1.

FIG. 2 is an exemplary diagram of the device 108 of FIG. 1. As shown in FIG. 2, device 108 may include a speaker 202, a display 204, control buttons 206, a keypad 208, a microphone 210, and a camera 212. Speaker 202 may provide audible information to a user of device 108. Display 204 may provide visual information to the user. For example, display 204 may provide information regarding incoming or outgoing calls, media, games, phone books, the current time, etc. In one implementation, display 204 may provide the user with a graphical user interface for inputting various parameters associated with communication. Control buttons 206 may permit the user to interact with device 108 to cause device 108 to perform one or more operations. Keypad 208 may include a standard telephone keypad. Microphone 210 may receive audible information from the user. Camera 212 may enable a user to capture and store video and/or images (e.g., pictures).

Figure 3:
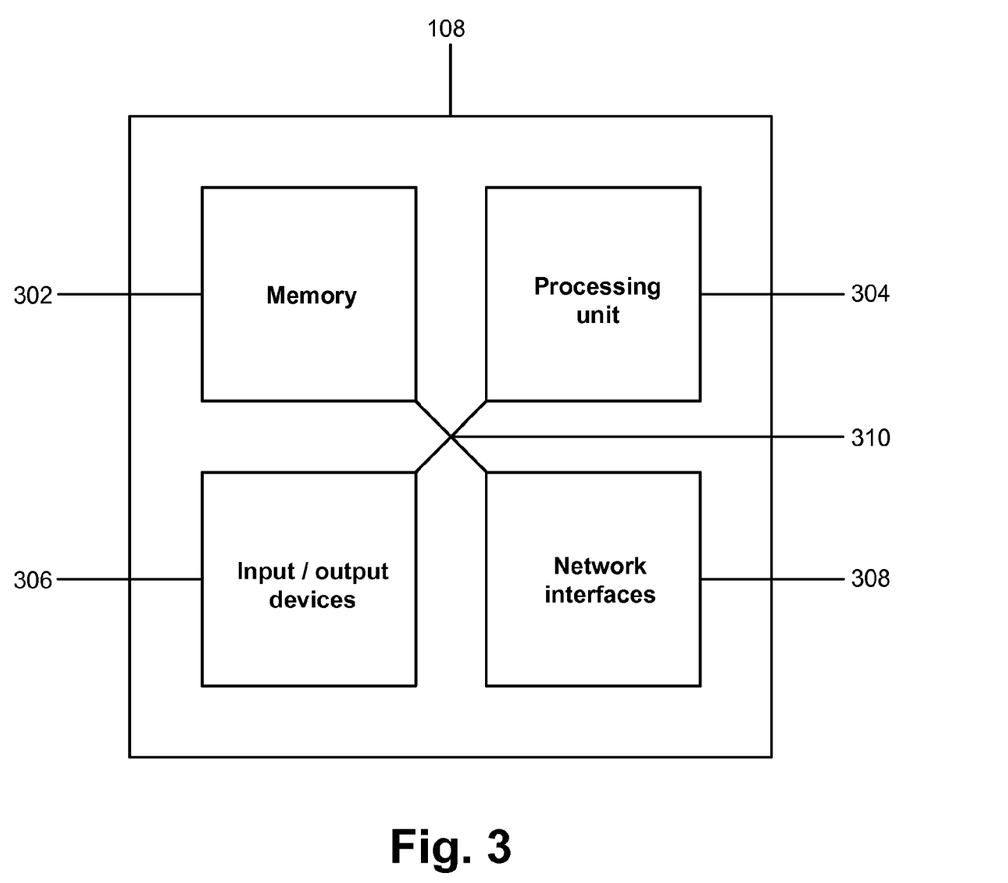
FIG. 3 is a block diagram of exemplary components of the device of FIG. 2.

FIG. 3 is a block diagram of exemplary components of the device of FIG. 2. As illustrated, device 108 may include memory 302, processing unit 304, input/output devices 306, network interfaces 308, and communication bus 310. In another implementation, device 108 may include more, fewer, or different components.

Memory 302 may include static memory, such as read only memory (ROM), and/or dynamic memory, such as random access memory (RAM), or onboard cache, for storing data and machine-readable instructions. Memory 302 may also include storage devices, such as a floppy disk, CD ROM, CD read/write (R/W) disc, and/or flash memory, as well as other types of storage devices.

Processing unit 304 may include one or more processors, microprocessors, and/or processing logic capable of controlling device 108. Input/output device(s) 306 may include devices for converting physical events or phenomena to and/or from digital signals that pertain to device 108. Examples of input/output device(s) 306 may include a keyboard, display 204, key pad 208, button, mouse, speaker 202, microphone 210, camera 212, Digital Video Disk (DVD) writer, DVD reader, USB port, and/or WUSB port.

Network interfaces 308 may include any transceiver-like mechanism that enables device 108 to communicate with other devices and/or systems. For example, network interfaces 308 may include mechanisms for communicating via a network, such as the Internet, a terrestrial wireless network, a satellite-based network, personal area network, etc.

Communication bus 310 may provide an interface through which the components of device 108 can communicate with one another.

Figure 4:
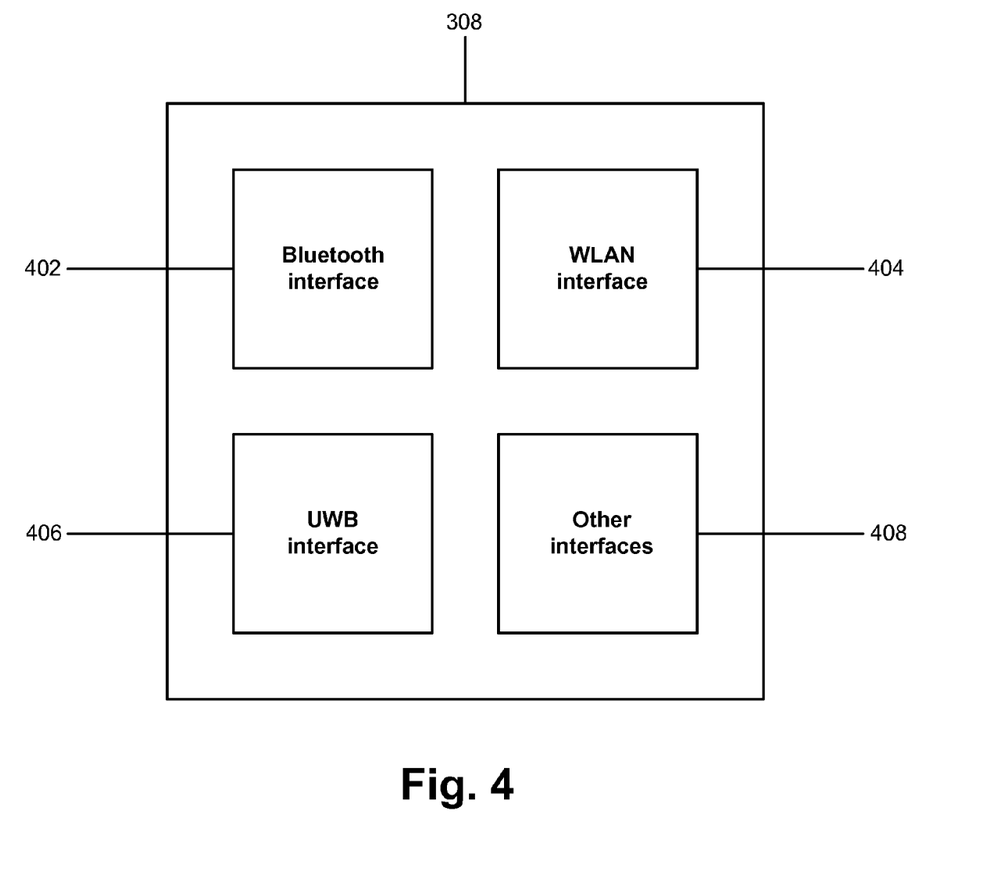
FIG. 4 is a block diagram of exemplary components of the network interface of FIG. 3.

FIG. 4 is a block diagram of exemplary components of the network interface 308 of FIG. 3. Network interface 308 may include a Bluetooth interface 402, a WLAN interface 404, a UWB interface 406 and/or other interfaces 408.

Bluetooth interface 402 may include hardware and/or software for communicating with other devices in wireless network 102, using the Bluetooth communication standard. WLAN interface 404 may include hardware and/or software for communicating with devices in a WLAN, as part of wireless network 102. UWB interface 406 may include hardware and/or software for communicating with other devices in wireless network 102 through the ultra wide band (i.e., bandwidth>500 MHz). Other interfaces 408 may include hardware and/or software for communicating with other devices in wireless network 102 and/or network 104. Examples of other interfaces 408 may include an Ethernet interface for participating in a local area network (LAN) based on IEEE 802.3 standard and a mobile transceiver interface for sending and receiving signals to communicate with cellular base stations.

Figure 5:
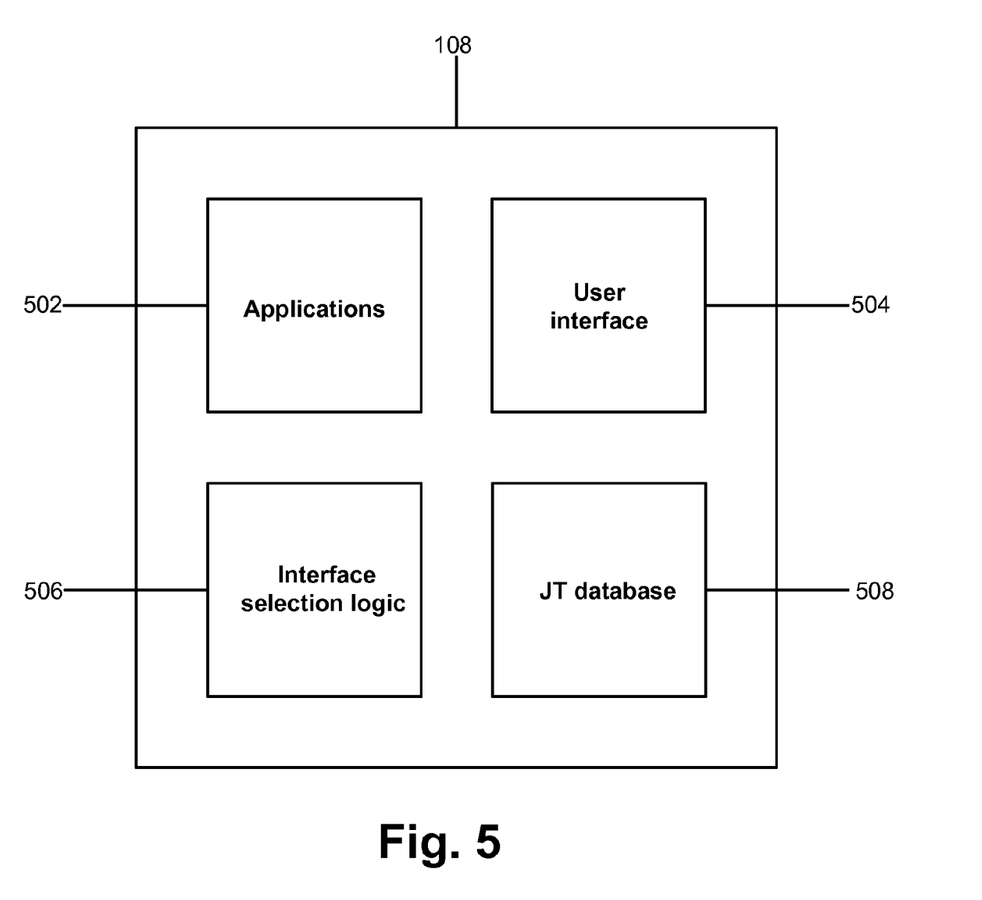
FIG. 5 is an exemplary functional block diagram of exemplary components that may be either implemented on or included in the device of FIG. 3.

FIG. 5 is an exemplary functional block diagram of exemplary components that may be either implemented on or included in device 108. As illustrated, device 108 may include applications 502, user interface 504, interface selection logic 506, and/or JT database 508. Applications 502 may include hardware and/or software for supporting various functionalities of device 108. For example, applications 502 may support text messaging services, email, file uploading, file downloading, image transfer, etc. Further, in providing such support, applications 502 may rely on user interface 504, interface selection logic 506 and/or database 508. For example, applications 502 may rely on interface selection logic 506 for downloading files (e.g., a ring tone).

User interface 504 may include hardware and/or software for allowing a user to interact with applications 502, interface selection logic 506, and/or database 508. For example, user interface 504 may display a text box for a user to input alphanumeric characters using input/output devices 306. Interface selection logic 506 may include hardware and/or software for selecting a particular communication interface in network interfaces 308. In selecting the interface, interface selection logic 506 may consult JT database 508.

JT database 508 may include records, tables, ordered lists, linked lists, files and/or organized data structures that may be searched and modified. JT database 508 may act as an information repository for interface selection logic 506, and interface selection logic 506 may retrieve from and store into JT database 508 information that is used to select a particular communication interface. More specifically, JT database 508 may store values of parameters associated with transferring a given quantity of data through different types of communication interfaces.

Figure 6:
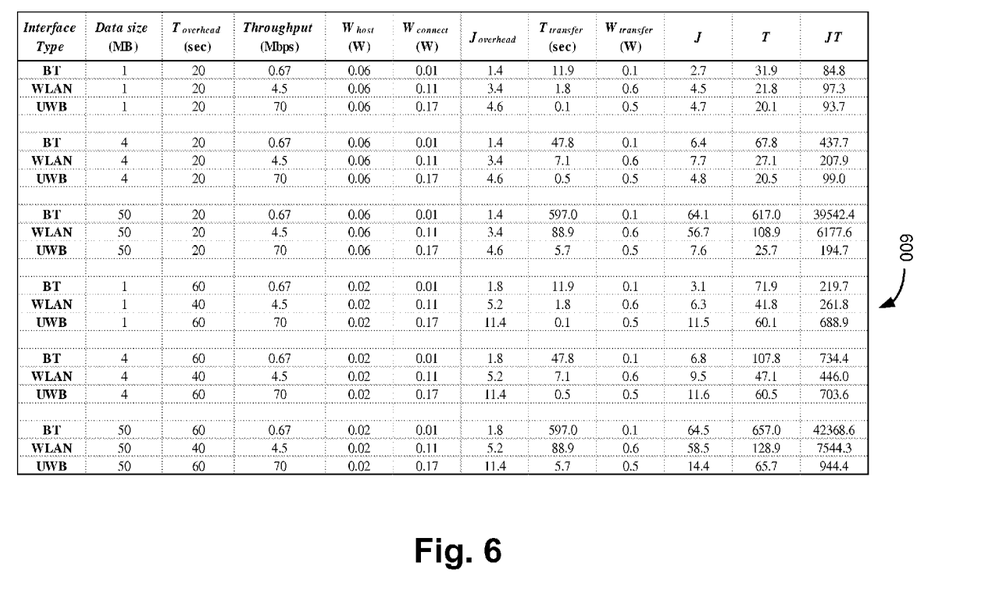
FIG. 6 shows an exemplary tabular representation of the JT database of FIG. 5.

FIG. 6 shows an exemplary tabular representation JT database 508 of FIG. 5. A row in JT table 600 of FIG. 6 may include the following exemplary fields: Interface Type, Data Size, $T_{overhead}$, Throughput, $W_{host}$, $W_{connect}$, $J_{overhead}$, $T_{transfer}$, $W_{transfer}$, J, T, and JT. In practice, JT database 600 may include additional, fewer or other fields than those illustrated in FIG. 6.

Interface Type may specify the type of interface through which information is to be transferred. In one implementation, an interface may be Bluetooth (which is shown as BT in FIG. 6), WLAN, or UWB. Data Size may provide the amount of information that is to be transferred by a particular interface. $T_{overhead}$ may specify the time taken by an interface to set up for transferring information as well as the time it takes to switch between various modes (e.g., power save mode) to an information transfer mode. Throughput may specify an average transfer rate (e.g., bytes/sec, bits/sec) for an interface. $W_{host}$ may specify the power which is delivered to an interface, in watts, when the interface is idle. $W_{connect}$ may specify the increase in power when the interface makes a communication connection with an end point. $J_{overhead}$ may represent the energy consumed by an interface to prepare for communicating information as well as the energy the interface uses to switch between various modes. $T_{transfer}$ and $W_{transfer}$ may specify the time taken by the interface to transfer a given amount of information and the power used to transfer the same, respectively. J and T may represent the total energy consumed and the total time taken, respectively, by an interface during the transfer of a given amount of information. JT may represent a product of energy and time consumed by the interface identified in the Interface Type field and for the amount of data specified in the Data Size field.

JT table 600 in FIG. 6 may be implemented by storing in JT database 508 the values for Interface Type, Data Size, $T_{overhead}$, Throughput, $W_{host}$, $W_{connect}$, $J_{overhead}$, $T_{transfer}$, $W_{transfer}$, J, T, and JT. The values for fields $W_{transfer}$, $T_{transfer}$, $W_{host}$, $W_{connect}$, and $T_{overhead}$ may be determined through empirical measurements, given an interface type and a size of data. Values for other fields, such as J, $J_{overhead}$, T, and $T_{transfer}$ may be calculated based on simple relationships between the fields.

In one implementation, approximate values for JT may be obtained by first evaluating J, which may be described by:

$$J = J_{overhead} + W_{transfer} \cdot T_{transfer}. \tag{1}$$

The terms $J_{overhead}$, $T_{transfer}$, and $W_{transfer}$ are as described above.

In addition, $J_{overhead}$ may be expressed as:

$$J_{overhead} = (W_{host} + W_{connect}) \cdot T_{overhead}. \tag{2}$$

T may be expressed as:

$$T = T_{overhead} + T_{transfer} = T_{overhead} + \text{Data Size/Throughput}. \tag{3}$$

Throughput may be provided by an interface manufacturer.

Given Data Size, and Throughput, it is possible to take measurements for $W_{transfer}$, $W_{host}$, $W_{connect}$, and $T_{overhead}$ for an interface. Furthermore, based on the given and the measured values, the terms such as J, $J_{overhead}$, T, and $T_{transfer}$, may be computed, using expressions (1)-(3).

JT may be determined by making the following approximation:

$$JT \approx = J \cdot T. \tag{4}$$

In another implementation, estimates for JT may be produced based on an expression that is different from expression (4). For example, JT can be approximated as:

$$JT \approx = J_{overhead} \cdot T_{overhead} + J_{transfer} \cdot T_{transfer}. \tag{5}$$

The terms $J_{overhead}$, $T_{overhead}$, $J_{transfer}$, and $T_{transfer}$ in expression (5) may be determined as explained above.

Depending on the implementation, JT database 508 may be designed as a table that includes more or fewer columns and/or rows than JT table 600. For example, in some implementations, JT database 508 may contain information about wireless network interfaces in addition to the Bluetooth, WLAN, and/or UWB interfaces.

In one implementation, JT database 508 may exclude certain columns in JT table 600, such as $J_{overhead}$, $T_{transfer}$, J, T, and JT. In such an implementation, the exclusion of the columns may necessitate on-the-fly computations of JT for different types of interfaces, using $W_{transfer}$, $W_{connect}$, Throughput and $T_{overhead}$, which may be retrieved based on Data Size and $W_{host}$. The implementation may offer flexibility, because if different ways of determining JT is desired, JT database 508 may not need to be modified; modifying interface selection logic 506 may suffice.

In another implementation, JT database 508 may be designed to include a column for JT and to exclude columns for $T_{overhead}$, Throughput, $W_{connect}$, $J_{overhead}$, $T_{transfer}$, $W_{transfer}$, J, and T. Such an implementation may reduce memory use associated with determining JT.

Figure 7:
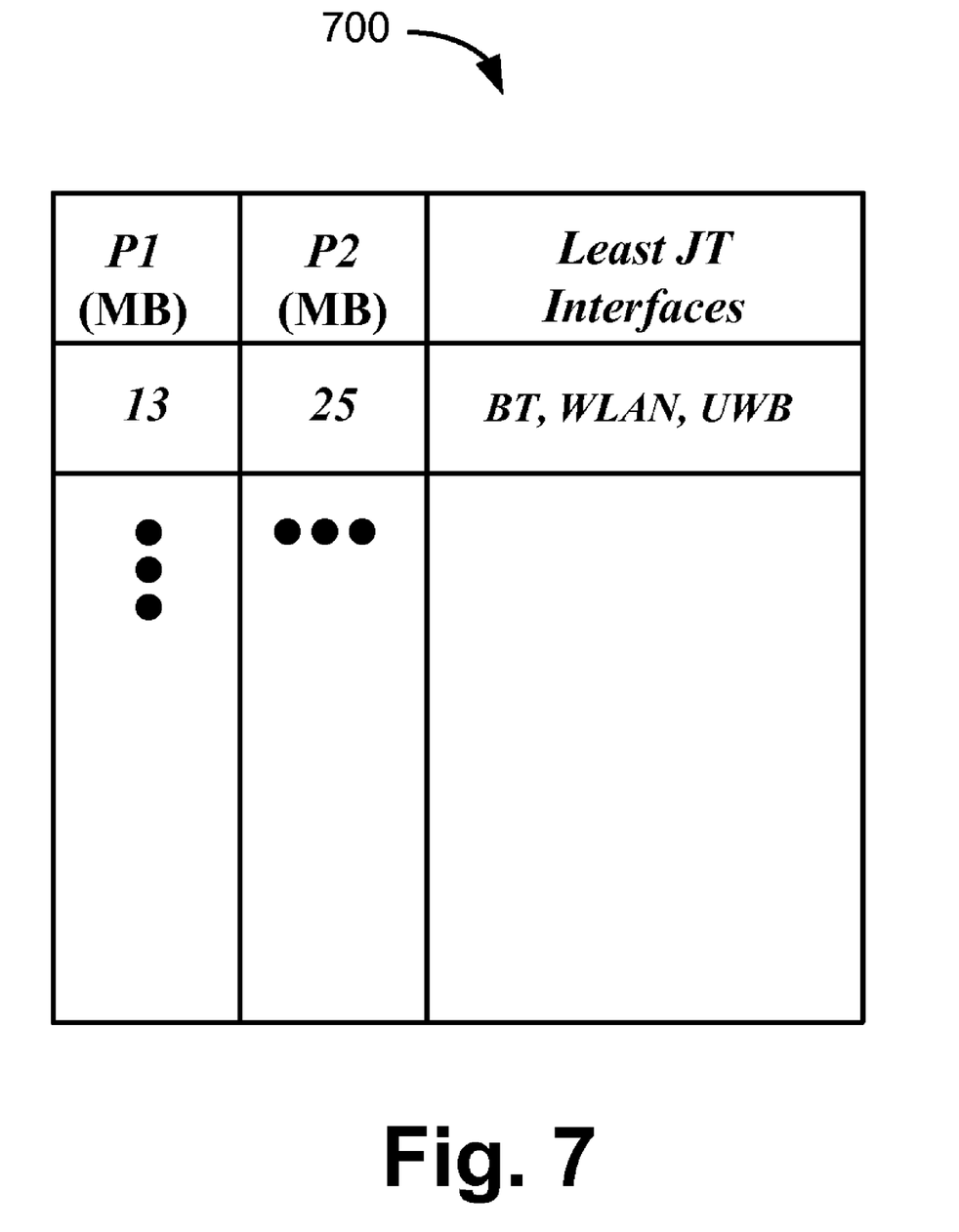
FIG. 7 shows a table of data sizes for determining which network interface has the lowest energy-time product.

In yet other implementations, JT database 508 may be designed to be compact and to contain different fields than those discussed above with respect to JT table 600. FIG. 7 shows table 700, which illustrates one such implementation.

As will be explained shortly, each row in table 700 may characterize a set of curves, where each curve plots JT as a function of the amount of data that is transferred at a particular interface. The set of curves that may be characterized by the first row of table 700 is illustrated in FIG. 8.

Figure 8:
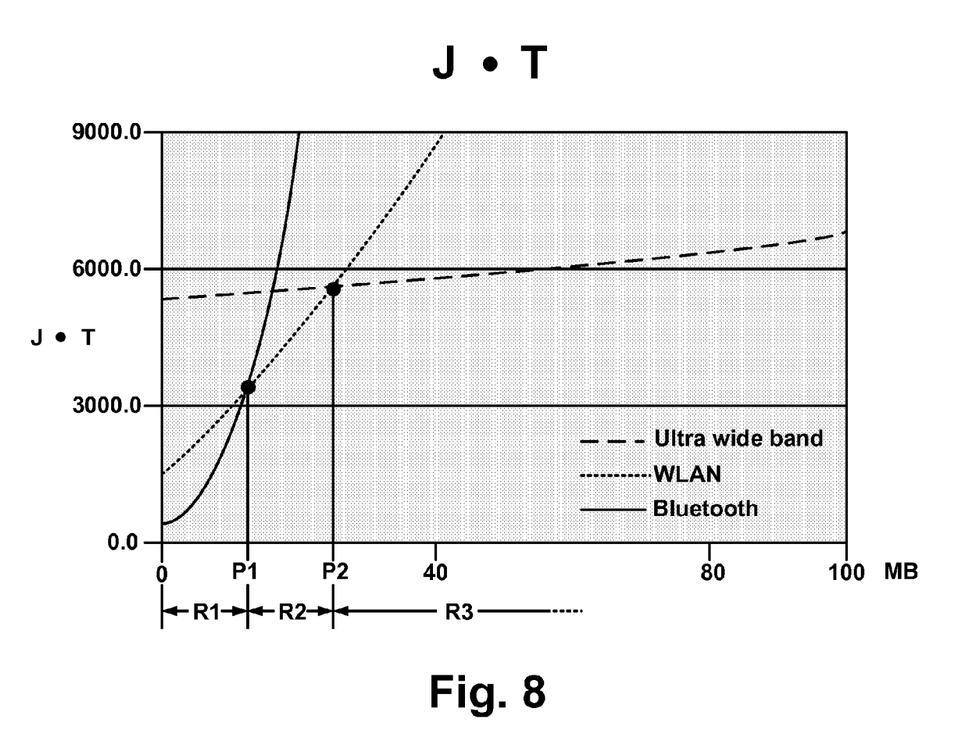
FIG. 8 shows a graph of energy-time products as functions of data transferred on Bluetooth, Wireless Local Area Network (WLAN), and Ultra Wide Band (UWB) interfaces.

In FIG. 8, the curves show, depending on the size of data that is to be transferred, a particular interface as having the lowest JT value. To be more specific, in FIG. 8, when the number of bytes to be transferred is lower than P1, thus, is in region R1, the Bluetooth interface has the lowest JT value; between P1 and P2 (i.e., region R2), the WLAN interface has the lowest JT value; and above P2 (i.e., region R3), the UWB interface has the lowest JT value. Thus, for example, if the size of data to be transferred in 60 MB, which is above P2 in FIG. 8, the UWB interface has the lowest JT value, close to around 6000.0 joule-seconds.

FIG. 8 shows that, if P1 is known and the interface with the lowest JT value in each of regions R1, R2, and R3 is known, specifying the data size may be sufficient to identify the interface that has the lowest JT value. For example, suppose P1 occurs at 13 MB and P2 occurs at 25 MB. Then, if the number of bytes to be transferred were 17 MB, the WLAN interface would be identified as having the lowest JT value, as 17 MB is in region R2.

In FIG. 7, each row of table 700 may include the fields P1, P2, and Least JT Interfaces, for specifying P1, P2, and the interface with the lowest JT value in each of regions R1, R2, and R3. For instance, the first row of table 700 shows a P1 value of 13 MB, a P2 value of 25 MB, and a Least JT Interfaces value of "BT, WLAN, UWB." The string "BT, WLAN, UWB" in Least JT Interfaces field indicates that the Bluetooth interface may have the lowest JT value in region R1, the WLAN interface in region R2, and the UWB interface in region R3.

Using table 700 may involve looking up the values of P1 and P2. For example, assume that there are 19.8 MB to be transferred. Looking up the table in FIG. 7 yields P1 of 13 MB and P2 of 25 MB, and Least JT Interfaces of "BT, WLAN, UWB." Since 19.8 MB is between 13 MB and 25 MB, according to the table, the WLAN interface may be identified as the interface that yields the lowest JT value.

Constructing table 700 in FIG. 7 may involve obtaining values for P1 and P2, which in turn may involve determining the intersections between different curves for different interfaces. The fields in table 700 may reflect the number of intersections, which may be more or fewer than two. For example, if P1 were 15 MB, and if P2 did not exist, P1 value may be 15 MB, P2 value may be 0 MB to indicate P2 does not exist, and Least JT Interfaces value may be "BT, UWB" to indicate that the Bluetooth interface has the lowest JT value in region R1 and the UWB interface has the lowest JT value in region R2.

Exemplary Process for Selecting a Wireless Network Interface

Figure 9:
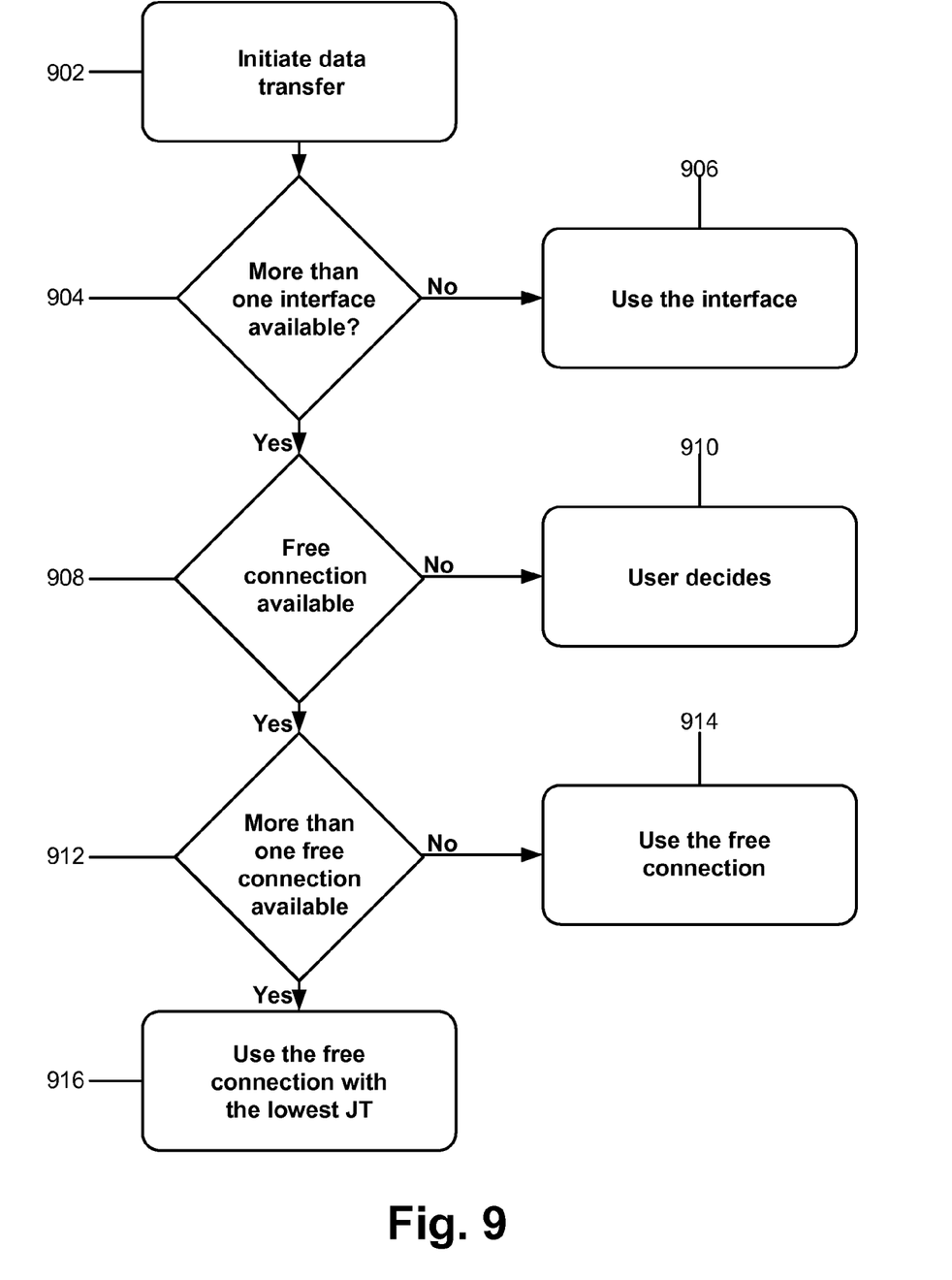
FIG. 9 shows an exemplary process for selecting a wireless network interface.

FIG. 9 shows an exemplary process for selecting a wireless network interface. At block 902, a data transfer may be initiated. The transfer may be a transmission or a reception of data of known size. If the data size is not known, a default value may be used.

At block 904, whether more than one interface is available may be determined. An interface may be considered available if the interface is operational and/or the interface is open for transmission or reception. If there is only one available interface, the interface may be used to transfer the data (block 906).

If more than one interface is available, at block 908, the available interfaces may be checked to determine whether there are available free connections. A connection may be free if the connection can be established and used free of charge (i.e., at no cost to the user) through an available interface. If none of the available interfaces provides a free connection, at block 910, the user may select the interface that can transmit at the lowest cost or based on other criteria. In one implementation, device 108 may select the interface for the user based on cost or other factors (e.g., download time).

At block 912, whether more than one free connection is available may be determined. If there is only one available free connection, the free connection may be used to transfer the data (block 914).

At block 916, if more than one free connection is available, the free connection with the lowest JT may be used to transfer data. To determine the connection with the lowest JT, JT database 508 may be consulted based on the data size, at a particular $W_{host}$, for each available interface with a free connection. For instance, if 1 megabyte is to be transferred and 0.02 watts is being expended at the Bluetooth, WLAN, and UWB interfaces, JT database 508 may be consulted to find JT of 84.8 joule-seconds for the Bluetooth interface, 97.3 joule-seconds for the WLAN interface, and 93.7 joule-seconds for the UWB interface. Of the three interfaces, as illustrated in FIG. 6, the Bluetooth interface provides the lowest JT value, and thus, the Bluetooth interface may be used to establish a connection for transferring the data.

In looking up JT values in JT database 508, if the number of bytes is not one of the searchable keys in JT database 508 (e.g., 15 MB in FIG. 6), the closest keys (e.g., 4 MB or 20 MB in FIG. 6) may be used to look up JT values. The returned values may be interpolated to provide greater accuracy.

Exemplary Process for Creating/Updating Data

Figure 10:
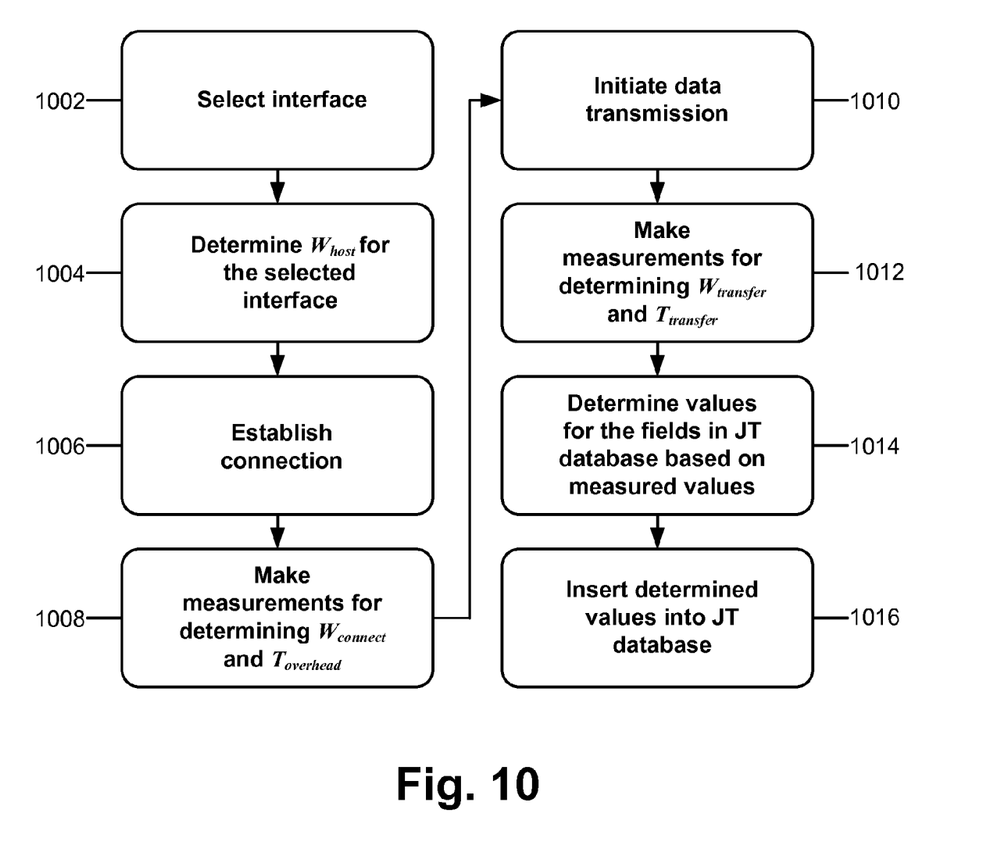
FIG. 10 shows an exemplary process for creating/updating data at the JT database of FIG. 5.

FIG. 10 shows an exemplary process for creating/updating data at JT database 508. At block 1002, an interface may be selected. The interface may be selected in accordance with the process described above with reference FIG. 9, or may be selected manually.

At block 1004, $W_{host}$ may be determined for the selected interface. The power $W_{host}$ may be determined based on voltage and current measurements across the selected interface.

At block 1006, a connection may be established, using the selected interface. While the connection is being established, at block 1008, measurements for determining $W_{connect}$ and $T_{connect}$ may be made.

At block 1010, a data transmission may be initiated. While the data is being transferred, at block 1012, measurements for determining $W_{transfer}$ and $T_{transfer}$ may be made.

At block 1014, values for the fields in JT database 508 may be determined based on the measured values. The field values may be determined in accordance with expressions (1)-(4) or (1)-(3) and (5).

At block 1016, the determined values may be sorered into JT database 508. If JT database 508 already has field values at a specific $W_{host}$ and Data Size, it is possible to update the field values by either averaging in the new values or by replacing the old values with the new ones.

EXAMPLE

The following example illustrates processes involved in selecting a network interface. The example is consistent with the exemplary process described above with reference to FIG. 9.

Assume that Jacob wishes to transfer a 50 MB video clip of his laboratory from his cell phone to Xiao-Jiao's cell phone. Assume that each of the phones has Bluetooth, WLAN, and UWB interfaces and that each of the interfaces is available for a connection. Assume also that a WLAN provider charges Jacob for using WLAN.

At Jacob's phone, a transfer of the video clip may be initiated. It is determined, at Jacob's phone, that more than one interface is available, and that, for the Bluetooth interface and the UWB interface, free connections are available. Further, because there is more than one free connection, the free connection with the lowest JT value may be used to transfer the video clip.

In selecting the free connection, JT table 600 may be consulted. At Jacob's phone, different values of JT may be obtained for the Bluetooth and UWB interfaces. According to JT table 600, assuming that Jacob's phone supplies its interfaces with 0.06 watts, the UWB interface may have the lowest JT at 194.7 joule-second, as compared to 39542.4 joule-second for the Bluetooth interface. After the selection, the UWB interface may be used to transfer the video clip to Xiao-Jiao's phone.

CONCLUSION

The foregoing description of embodiments provides illustration, but is not intended to be exhaustive or to limit the embodiments to the precise form disclosed. Modifications and variations are possible in light of the above teachings or may be acquired from practice of the teachings.

For example, while a network interface may be selected to transfer data according to the above implementations, it is also possible to have implementations in which a network interface is selected for receiving data. In one such implementation, a user may first view, perhaps through an existing connection, a list of files on another device and select a file from the list for downloading. To download the file, an interface may be selected by using a JT database similar to the ones already described.

In another example, while series of blocks have been described with regard to processes illustrated in FIGS. 9 and 10, the order of the blocks may be modified in other implementations. For instance, block 1014 may be performed before block 1012. In addition, non-dependent blocks, such as blocks 1008 and 1012 for different interfaces, may represent acts that can be performed in parallel.

It will be apparent that aspects described herein may be implemented in many different forms of software, firmware, and hardware in the implementations illustrated in the figures. The actual software code or specialized control hardware used to implement aspects should not be construed as limiting. Thus, the operation and behavior of the aspects were described without reference to the specific software code—it being understood that software and control hardware can be designed to implement the aspects based on the description herein.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the implementations have been described as "logic" that performs one or more functions. This logic may include hardware, such as a processor, an application specific integrated circuit, or a field programmable gate array, software, or a combination of hardware and software.

What is claimed is:

1. A method of communicating with a wireless device, connected to a wireless network, comprising:
   identifying a plurality of interfaces, available on the wireless device, to connect the wireless device to the wireless network;
   determining an energy-time product (JT) for each of the plurality of identified interfaces, where determining the energy-time product (JT) includes multiplying a total energy (J), which is projected to be consumed during a transmission period of data, by a total duration of time (T), which is a projected time to transmit the data;
   selecting one of the plurality of identified interfaces based on the determined energy-time product (JT); and
   transmitting the data to the selected interface.

2. The method as in claim 1, where determining an energy-time product for each of the plurality of identified interfaces includes:
   determining the energy-time product (JT) for each of the plurality of identified interfaces based on a size of the data.

3. The method as in claim 1, where identifying a plurality of interfaces includes:
   identifying available wireless network interfaces with free connections.

4. The method as in claim 1, where determining an energy-time product (JT) for each of the plurality of identified interfaces includes:

performing a lookup in a database for the energy-time product (JT) for each of the plurality of identified interfaces based on a size of the data.

5. The method as in claim 4, further comprising:
evaluating the energy-time product (JT) of the one of the plurality of identified interfaces by measuring parameters associated with transmitting the data; and
updating the database with the evaluated energy-time product (JT) of the one of the plurality of identified interfaces.

6. The method as in claim 4, where, if the size of the data is not found in the database, the method further includes:
performing a look up for an energy-time product (JT) associated with a next closest data size.

7. The method as in claim 1, where determining an energy-time product (JT) for each of the plurality of identified interfaces further includes:
determining the total energy (J) by adding energy ($W_{transfer}$), which is projected to be used while transmitting the data, to energy ($J_{overhead}$), which is projected as an overhead associated with transmitting the data.

8. The method as in claim 1, where determining an energy-time product (JT) for each of the plurality of identified interfaces further includes:
determining the total duration of time (T) by adding one time duration ($T_{transfer}$), which is projected for transmitting the data, to another time duration ($T_{overhead}$), which is projected as an overhead time associated with transmitting the data.

9. The method as in claim 8, where determining an energy-time product (JT) for each of the plurality of identified interfaces further includes:
determining the one time duration ($T_{transfer}$) by dividing a size of the data by a throughput of the one of the plurality of identified interfaces.

10. The method as in claim 1, where transmitting data through the one of the plurality of identified interfaces based on the determined energy-time products (JT) includes:
selecting, among the plurality of identified interfaces, an interface with a smallest energy-time product (JT);
establishing a connection using the selected interface; and
transmitting the data through the established connection.

11. A wireless device for connecting to a wireless network, the wireless device comprising: a processor to:
determine an availability of free connections that are associated with a plurality of interfaces, available on the wireless device,
connect the wireless device to the wireless network,
determine energy-time products (JT) for the free connections based on a size of data to be sent, where the energy-time products are determined by multiplying a total energy (J), which is projected to be consumed during a transmission period of the data, and a total duration of time (T), which is a projected time to transmit the data,
select, from among the free connections, a connection that has a minimum energy-time product (JT), and
send the data through the selected connection.

12. The device as in claim 11, where the total energy (J) includes:
energy ($J_{overhead}$) to switch one of the plurality of interfaces from an idle mode to a transmission mode.

13. The device as in claim 11, where the total time (T) includes:
a time ($T_{overhead}$) to switch one of the plurality of interfaces from an idle mode to a transmission mode.

14. The device as in claim 11, where the plurality of interfaces include at least one of:
a Bluetooth interface, a Wireless Local Area Network interface, or an Ultra Wide Band interface.

15. A wireless device for connecting to a wireless network, the wireless device comprising:
determining means for determining an availability of free connections that are associated with a plurality of network interfaces, available on the wireless device;
connecting means for connecting the wireless device to the wireless network;
processing means for determining energy-time products (JT) for the free connections based on a size of data to be sent, where the energy-time products are determined by multiplying a total energy (J), which is projected to be consumed during a transmission period of the data, and a total duration of time (T), which is a projected time to transmit the data;
storing means for storing sets of information, the sets of information containing the energy-time products (JT) for transmission of data through the plurality of network interfaces;
selection means for selecting one of the plurality of network interfaces based on one of the sets of information; and
transmitting means for transmitting data through the selected network interface.

16. The device as in claim 15, where the sets of information include measured values of power at the plurality of network interfaces.

17. A memory device that stores computer-executable instructions that include one or more instructions for causing a processor to:
detect an availability of free connections that are associated with a plurality of interfaces, available on a wireless device and for connecting the wireless device to a wireless network;
retrieve energy-time products (JT) for the free connections based on a size of data to be communicated, where the energy-time products are determined by multiplying a total energy (J), which is projected to be consumed during a transmission period of the data, and a total duration of time (T), which is a projected time to transmit the data;
select, among the free connections, a free connection that has a lowest energy-time product (JT); and
communicate the data through the selected free connection.

18. The memory device as in claim 17, where the one or more instructions for causing the processor to communicate the data include:
one or more instructions for causing the processor to receive the data through the selected free connection.

19. The memory device as in claim 17, where the one or more instructions for causing the processor to communicate the data include:
one or more instructions for causing the processor to transmit the data through the selected free connection.

* * * * *